United States Patent [19]
Johnston et al.

[11] 3,871,335
[45] Mar. 18, 1975

[54] PORTABLE APPARATUS FOR REMOVING POULTRY FROM A POULTRY HOUSE

[76] Inventors: Ambrose G. Johnston, Rt. 2, Box 247-A; Guy W. Howard, P.O. Box 12; William W. Bradshaw, Jr., P.O. Box 45, all of Rose Hill, N.C. 28458

[22] Filed: June 7, 1974

[21] Appl. No.: 477,225

[52] U.S. Cl. ............................................... 119/82
[51] Int. Cl. ........................................... A01k 29/00
[58] Field of Search ......... 119/82; 214/83.34; 198/1

[56] References Cited
UNITED STATES PATENTS

| | | | |
|---|---|---|---|
| 543,393 | 7/1895 | Mead | 119/82 |
| 2,808,159 | 10/1957 | Beltran Simo | 214/83.34 |
| 3,103,915 | 9/1963 | Crain et al. | 119/82 |
| 3,110,388 | 11/1963 | Elliott et al. | 119/82 X |
| 3,702,600 | 11/1972 | Bright et al. | 119/82 |

*Primary Examiner*—Hugh R. Chamblee
*Attorney, Agent, or Firm*—A. Yates Dowell, Jr.

[57] ABSTRACT

Portable, selectively operated apparatus for removing live poultry from a poultry house so that the poultry can be placed in coops or other holding or transporting devices without bruising or otherwise harming the poultry. The apparatus includes a vehicle having at least one extendable and retractable conveyor belt which can be extended into a poultry house and then wound on a reel after poultry have been herded onto the belt. Poultry carried by the belt are discharged from the opposite end of the vehicle. The vehicle includes apparatus for maintaining the belt substantially in tangential alignment with the upper portion of the reel so that the poultry can be discharged from the vehicle.

7 Claims, 5 Drawing Figures

PATENTED MAR 18 1975 3,871,335
SHEET 1 OF 2
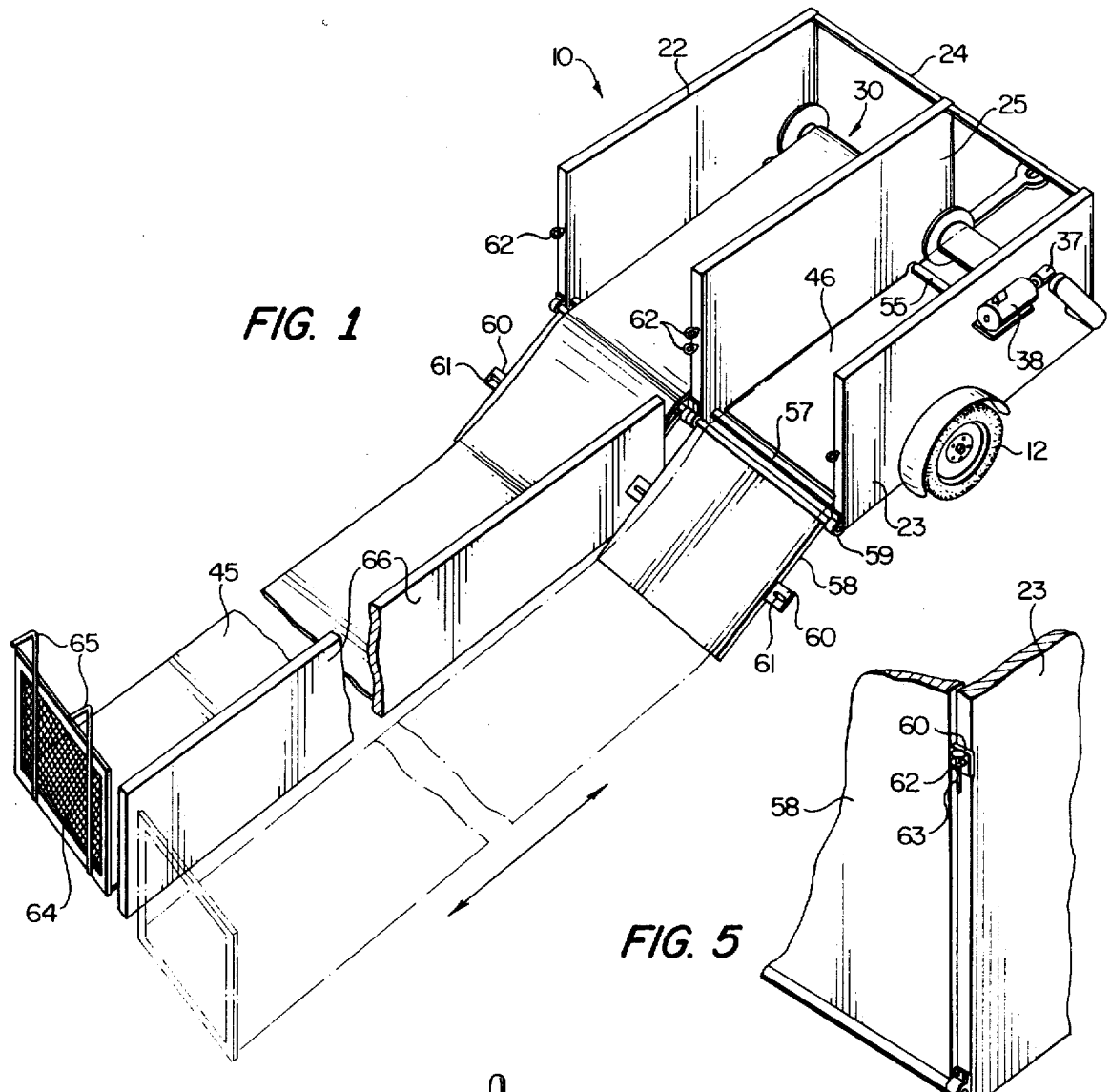
FIG. 1
FIG. 5
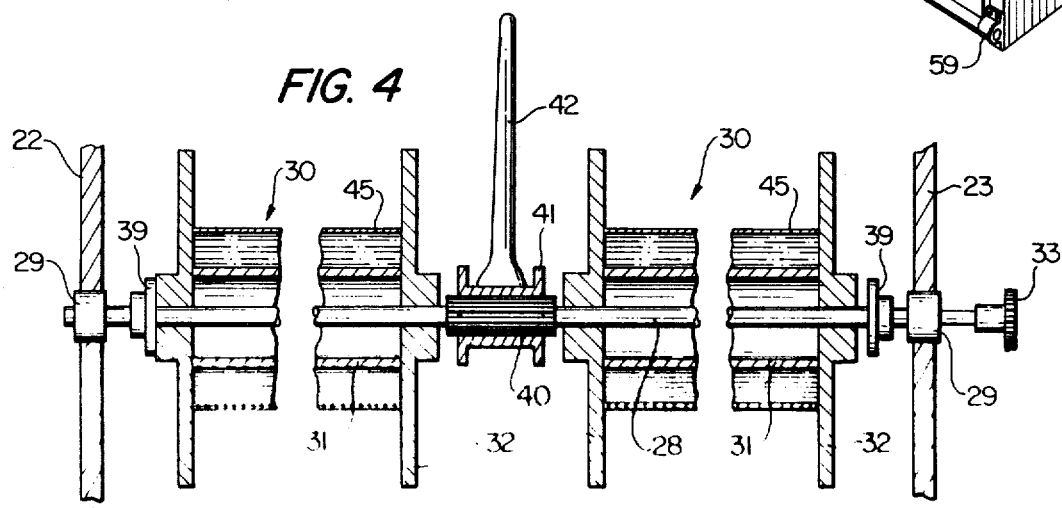
FIG. 4

PORTABLE APPARATUS FOR REMOVING POULTRY FROM A POULTRY HOUSE

BACKGROUND OF THE INVENTION

1. Field of the Invention

This invention relates generally to conveying systems and relates specifically to portable apparatus for selectively removing live fowl from a poultry house without bruising or otherwise harming the birds.

2. Description of the Prior Art

Heretofore, when it has been desired to ship poultry, such as chickens, turkeys, ducks, and the like, to a market or processing establishment, workmen normally have entered a poultry house with a relatively small coop and have herded the poultry together and then manually caught the birds to place them into the coop. Since the poultry normally try to avoid humans, it has been necessary for the workmen to chase the poultry until the poultry were cornered and could not escape. The handling of the poultry frequently has bruised or otherwise harmed the fowl which has reduced the market value thereof.

Some efforts have been made to provide conveyor apparatus for removing poultry from a house, pen, or the like, such as disclosed in the patent to Elliott et al., U.S. Pat. No. 3,110,388. However, these conveyors normally have been of the endless variety which made it necessary to herd the poultry up an inclined ramp before the poultry reached the upper run of the conveyor so that they could be removed from the poultry house. Poultry were discharged from the conveyor into a hopper or housing having a plurality of baffles and a counting mechanism which caused bruises on some of the birds. In order to prevent several birds from being discharged simultaneously into the counter, the width of the conveyor which removed poultry from the house was of a size to accommodate the birds in single file only.

Also, some efforts have been made to provide conveyors which are adapted to be uncoiled from a drum or reel and to be coiled on the reel after material has been placed thereon. An example of this type of structure is the patent to Lesser et al., U.S. Pat. No. 1,582,411. This type of conveyor normally is for use with inanimate objects, such as coal and the like, and usually is provided with upwardly inclined edges to retain the objects thereon.

SUMMARY OF THE INVENTION

The present invention is embodied in a portable apparatus for removing live poultry from a poultry house and includes a vehicle having ground-engaging wheels and means for connecting the vehicle to a propelling vehicle such as an automobile or the like. The vehicle or trailer is provided with a shaft on which a pair of reels normally are freely rotatably mounted and each reel has a conveyor belt coiled thereon in such a manner that the belt can be uncoiled and extended into a poultry house while the trailer remains outside the same. It is desirable to place the conveyor belts directly on the floor of the poultry house so that the poultry can be herded onto one of the conveyor belts without having to climb to an elevated position. In order to remove the poultry from the poultry house, a power plant carried by the trailer is adapted to rotate the shaft on which the reels are mounted and a selectively operated clutch mechanism is mounted in a manner to selectively connect one of the reels to the rotating shaft. Since the diameter of each reel increases as the conveyor belt is coiled thereon, apparatus is provided for maintaining the conveyor belt substantially in tangential alignment with the upper portion of the reel.

In this apparatus applicant is taking advantage of the nature and inherently poor balance of poultry in that poultry normally run in an effort to avoid humans; however, once poultry are placed on a moving base, they remain still and do not try to leave the moving apparatus.

It is an object of the invention to provide a portable apparatus for removing live poultry from a poultry house by providing a portable vehicle having at least one extendable and retractable conveyor and means for selectively operating the conveyor so that poultry are herded onto the conveyor within the house and thereafter the conveyor is operated to remove the poultry from the house and to discharge such poultry into other structure, such as a portable coop or a vehicle having cages so that the poultry can be transported to market or to a processing plant.

Another object of the invention is to provide a portable poultry loading vehicle having a conveyor belt coiled on a reel and means for maintaining the conveyor belt substantially in tangential alignment with the upper portion of the reel during the loading operation.

BRIEF DESCRIPTION OF THE DRAWINGS

FIG. 1 is a perspective illustrating one embodiment of the invention.

FIG. 4 is an enlarged fragmentary section on the line 4—4 of FIG. 2.

FIG. 5 is an enlarged fragmentary perspective of a rear corner of the vehicle.

DESCRIPTION OF THE PREFERRED EMBODIMENT

Figure 2:
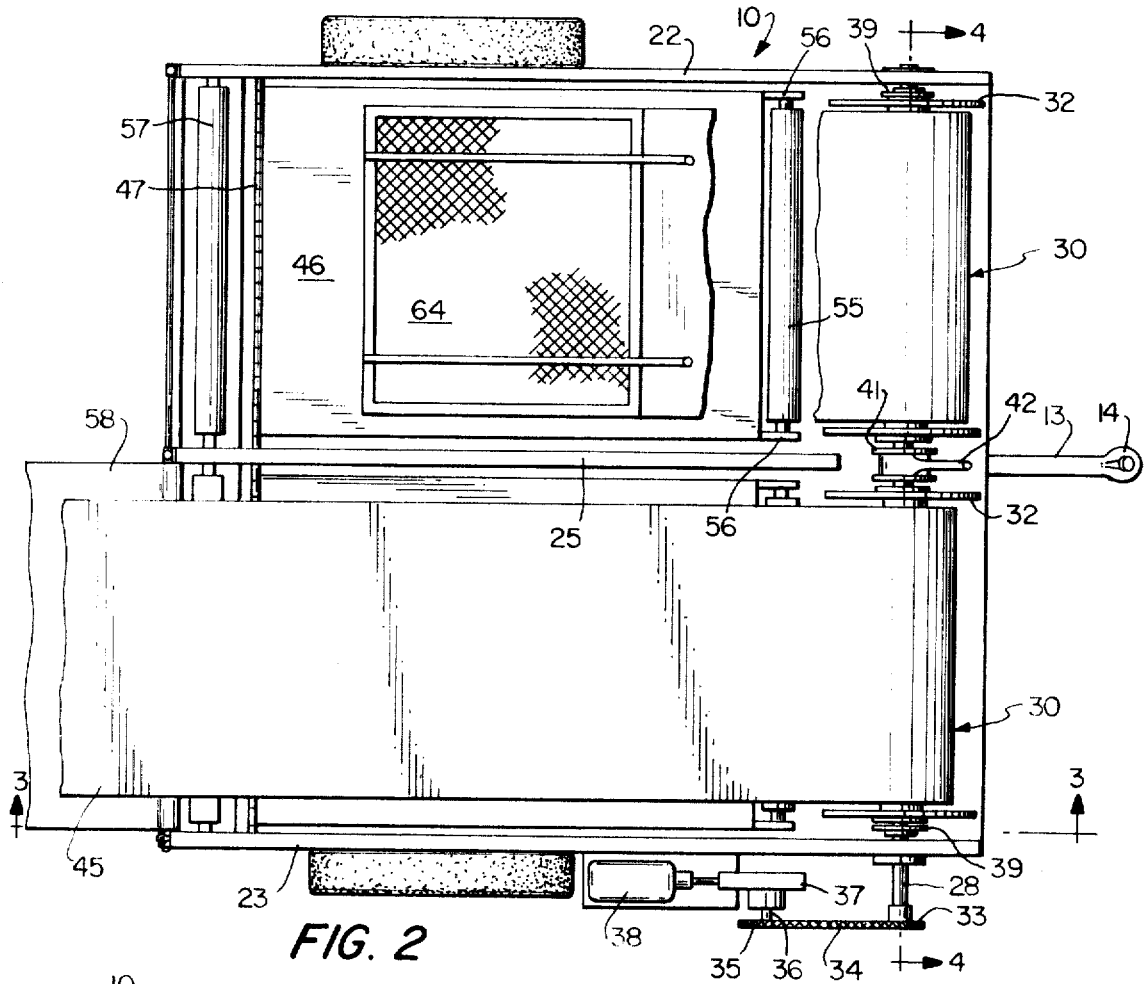
FIG. 2 is a top plan view thereof.

With continued reference to the drawings, a trailer 10 is provided having a chassis or frame 11 supported by ground-engaging wheels 12. A tongue 13 extends forwardly from the front of the frame 11 and such tongue may include a socket connection 14 which cooperatively receives a ball (not shown) carried by a propelling vehicle. At the front of the frame, a support foot 15 is swingably connected by a pivot 16 to a pair of lugs 17 carried by the frame and the foot includes a housing 18 with a telescoping rod 19 adjustably mounted therein. The lower end of the rod is connected to a foot plate 20 which engages the ground and supports the forward end of the trailer when the trailer is not being moved. A toggle linkage 21 connects the frame 11 to the housing 18 to maintain the support foot in a generally vertical position when in use but permits the support foot to swing upwardly to a collapsed position when the trailer is connected to a propelling vehicle.

The trailer 10 has upstanding generally parallel side walls 22 and 23 which extend substantially the full length of the trailer and which normally are connected by one or more braces 24. An intermediate wall 25 is located generally along the longitudinal axis of the trailer and generally parallel to the side walls 22 and 23.

At the forward end of the trailer a transversely disposed drive shaft 28 is rotatably mounted in bearings 29 carried by the side walls 22 and 23. A pair of reels or drums 30 are freely rotatably mounted on the shaft 28 in a manner that one of the reels is located between the side wall 22 and the intermediate wall 25 and the other reel is located between the side wall 23 and the intermediate wall 25. Each of the reels 30 includes an elongated generally cylindrical hollow core 31 enclosed at opposite ends by end members 32.

With particular reference to FIGS. 1 and 2, the shaft 28 has a sprocket 33 fixed to one end and such sprocket is driven by a chain 34 from a drive sprocket 35 mounted on a stub shaft 36 of a reduction box 37. The reduction box is driven by a power plant 38, such as an electric motor, internal combustion engine, hydraulic motor, or the like. Preferably the reduction box includes a conventional worm and pinion, although it is contemplated that a mechanical gear train or other speed reducing mechanism could be used.

Normally each of the reels 30 is freely rotatably mounted on the shaft 28; however, it is important that such reels be capable of being selectively driven for a purpose which will be described later. In ordedr to selectively drive the reels, a collar 39 is fixed to the shaft 28 adjacent to the outer end member 32 of each of the reels. The central portion of the shaft 28 has an enlarged spline 40 on which a clutch member 41 is slidably mounted under the influence of a shifting fork 42. When the clutch member 41 is in an intermediate position, as illustrated in FIG. 4, both reels 30 are freely rotatably mounted on the shaft; however, when it is desired to rotate one of the reels, the clutch member 41 is shifted into frictional engagement with the reel so that the rotating shaft causes rotation of the reel.

A flexible conveyor belt 45 is coiled on each of the reels 30 and such conveyor belts can be constructed of any desired material, such as rubber, cloth, metal, or the like. Each conveyor belt can be of any desired width and length although a width of approximately 36 inches and a length sufficient to extend outwardly of the trailer a distance of approximately 40 feet has been found satisfactory.

It will be apparent that the diameter of the reel 30 will be reduced as the conveyor belt 45 is removed from the reel and will increase as the conveyor belt is wound onto the reel. In order to maintain the conveyor belt in substantially tangential alignment with the periphery of the reel, a floor 46 is pivotally connected at one end by a hinge 47 to the frame 11 adjacent to the rear of the trailer. At the opposite end of the floor, a pair of air-cushioning members 48 are provided having upper and lower telescoping portions 49 and 50, respectively. The upper portion 49 is swingably connected by a pivot 51 to a pair of lugs 52 extending downwardly from the floor 46 and the lower telescoping portion 50 is connected by a pivot 53 to a pair of lugs 54 mounted on the frame 11. Each of the air-cushioning members 48 is supplied with a predetermined quantity of fluid under pressure such as five to seven pounds of compressed air to cause the floor 46 to swing upwardly about the hinge 47.

In order to guide the conveyor belt 45, the forward end of the floor 46 is provided with a roller 55 journaled in support arms 56 fixed to the floor. The upper portion of the roller 55 is disposed slightly above the upper surface of the floor 46. At the rear of the trailer 10 a second roller 57 is provided which is journaled in bearings carried by the frame 11 in such a manner that the upper portion of the roller 57 is slightly above the upper surface of the floor 46.

At the rear of the trailer 10 a pair of ramps 58 are provided for guiding the conveyor belts 45 from the floor of the poultry house onto the floor 46. Each of these ramps is connected at one end by a hinge 59 to the frame 11 of the trailer and is inclined downwardly so that the opposite end is in engagement with the earth when the device is in operation. When the vehicle is being transported from place to place, the ramps 58 are swung upwardly to a substantially vertical position so that they function as a tail gate of the vehicle and in raised position the ramps are connected to the side walls 22 and 23 and the intermediate wall 25 to give added support and rigidity to the upright walls. The ramps can be connected to the upright walls in any desired manner; however, as illustrated in FIGS. 1 and 5, each of the ramps is provided with a laterally extending plate or hasp 60 having a slot 61 through which an eye-bolt 62 extends when the ramp is in raised position. The eye-bolt is welded or otherwise secured to the upright walls of the tailer so that after the hasp has passed over the eye-bolt into locking position, a pin 63 is inserted through the eye to lock the ramp in closed position. By merely removing the pins 63, the ramp can be lowered to an inclined position.

If desired, the free end of each of the conveyor belts 45 may be provided with a fence 64 having at least one handle-forming rod 65 so that the fence 64 can be held in a substantially vertical position to prevent poultry from being discharged from the end of the conveyor belt when the belt is being wound onto the reel.

When the trailer 10 is provided with a pair of conveyor belts, as illustrated in FIG. 1, and is in position to remove poultry from a poultry house, a barrier 66 normally is placed between the conveyor belts and substantially in longitudinal alignment with the intermediate wall 25.

Although the trailer 10 has been illustrated and described as having ground-engaging wheels rotatably mounted on a fixed axle, it is contemplated that the axle could be rotatably mounted on the frame 11 and extend outwardly from the opposite side thereof. A downwardly and rearwardly extending crank arm could be connected to each end of the axle and the opposite end of each of the crank arms could be provided with a stub shaft for rotatably mounting the wheels. A fluid cylinder connected to any convenient source of fluid under pressure could be swingably connected to the trailer and have a piston rod connected to the crank of each wheel to cause swinging movement of the cranks relative to the trailer. By doing this the trailer could be disposed in an elevated position during transportation from one location to another and could be lowered so that the frame 11 is in engagement with the ground while in use.

In the operation of the device, the trailer 10 is towed to a poultry house and is aligned with an opening such as a door or the like in the wall of the house. The ramps 58 are lowered so that they extend into the house and the conveyor belts 45 are unwound from the reels 30 and extended across the floors 46 and ramps 58 so that they are disposed a substantial distance into the poultry house. When the conveyor belts are in position, the barrier 66 is erected between the belts. Thereafter workmen herd the poultry within the house onto the conveyor belts 45. When a desired number of poultry are located on one of the conveyor belts, the power plant 38 is started and a workman raises the fence 64. The clutch member 41 then is shifted to engage the reel 30 to cause rotation thereof to rewind the conveyor belt onto the reel 30.

Figure 3:
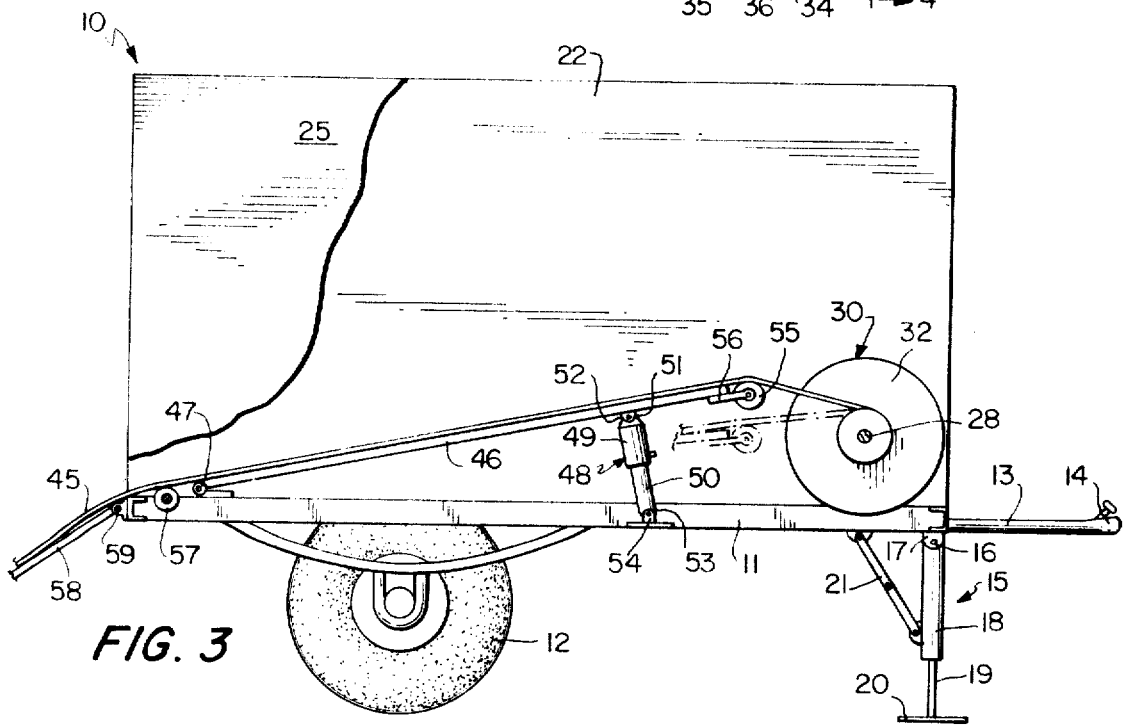
FIG. 3 is a section on the line 3—3 of FIG. 2.

Before the clutch member is energized, the air-cushioning members 48 maintain the floor 46 in a raised position, as illustrated in full lines in FIG. 3, to maintain a tension on the conveyor belt. When the reel 30 is rotated the weight of the poultry on the belt and the friction of the belt along the floor of the poultry house cause the forward portion of the floor 46 to compress the air within the cushioning members 48 so that the belt is substantially in tangential alignment with the upper portion of the belt that is coiled on the reel 30. As the belt is being coiled onto the reel, the pressure within the air-cushioning members 48 maintains the floor in substantially tangential alignment with the upper portion of the reel. As the belt is being wound onto the reel 30, the poultry carried by the belt travel up the ramp 58 and along the floor 46 to the reel where they are discharged from the trailer.

If desired, the poultry being discharged from the trailer can be discharged directly into cages or coops, or can be discharged onto a second conveyor which can carry the poultry to a transporting vehicle having cages or coops thereon.

When one of the conveyor belts 45 has discharged all of the poultry thereon, the clutch member 41 is disengaged from the first reel 30 after which the clutch member can be shifted to engage the other reel to discharge poultry from the other belt. After the first reel has been disengaged, the conveyor belt can again be pulled from the reel and extended into the poultry house so that a second group of poultry can be herded onto the belt.

It has been found that conveyor belts which are three feet wide and extend from the trailer approximately 40 feet into the poultry house can accommodate between 500 and 600 chickens each time the conveyor belt is operated. Since the poultry is not handled manually, bruises and other damage to the birds is substantially reduced.

We claim:

1. A portable apparatus for removing live poultry from a poultry house having a floor comprising a vehicle having a frame, at least two upright side walls mounted on said frame and extending longitudinally thereof, a drive shaft rotatably mounted on said vehicle, means for driving said shaft, at least one reel freely rotatably mounted on said shaft between said walls, conveyor belt means normally carried by said reel but capable of being partially pulled therefrom and extended into the poultry house, said conveyor belt means resting on the floor of the poultry house when extended, clutch means selectively connecting said reel to said drive shaft to drive said reel in one direction, a floor movably mounted on said frame, and resilient cushioning means engaging said floor to urge said floor upwardly and maintain the floor substantially in tangential alignment with the upper portion of said reel under normal load conditions, whereby when said conveyor belt is extended into a poultry house, poultry are herded onto the belt means and thereafter the clutch means is operated to cause the reel to rotate and wind the conveyor belt means thereon while discharging poultry from the vehicle.

2. The structure of claim 1 in which said vehicle includes an intermediate wall located between said side walls, a pair of reels freely rotatably mounted on said shaft, and said clutch means selectively connects either or neither of said reels to said drive shaft.

3. The structure of claim 2 including barrier means located between the conveyor belt means when extended.

4. The structure of claim 1 including means on said trailer providing a connection to a propelling vehicle.

5. The structure of claim 1 including guide rollers located at each end of said floor.

6. The structure of claim 1 including fence means carried by one end of said conveyor belt means.

7. A portable apparatus for removing live poultry from a poultry house having a floor comprising a vehicle having a frame supported by earth-engaging wheels, a pair of upright side walls mounted on said frame and extending the full length thereof, an intermediate wall located between said side walls and being substantially parallel therewith, a drive shaft rotatably carried by said side walls, a power plant mounted on said vehicle and drivingly connected to said shaft, a first reel freely rotatably mounted on said drive shaft between one of said side walls and said intermediate wall, a second reel freely rotatably mounted on said drive shaft between the other side wall and said intermediate wall, clutch means for selectively connecting either or neither of said reels to said drive shaft, a flexible conveyor belt normally carried by each of said reels but capable of being pulled therefrom and extended into the poultry house, said conveyor belt resting on the floor of the poultry house when extended, a pair of floor members swingably mounted at one end on said frame and disposed substantially in alignment with said first and second reels, pressure operated cushioning means connecting the other end of each floor member to said frame to swing said other ends upwardly substantially into tangential alignment with the upper portions of said reels under normal load conditions, whereby when at least one of said conveyor belts is extended into a poultry house, a plurality of live birds are herded onto said belt and thereafter said clutch means is selectively operated to drivingly connect the reel of the extended belt to said drive shaft to cause the reel to wind the conveyor belt thereon while discharging poultry from the vehicle.

* * * * *